United States Patent
Sorenson, III et al.

(10) Patent No.: US 11,652,746 B1
(45) Date of Patent: May 16, 2023

(54) RESILIENT CONSISTENT HASHING FOR A DISTRIBUTED CACHE

(71) Applicant: Amazon Technologies, Inc., Seattle, WA (US)

(72) Inventors: James Christopher Sorenson, III, Seattle, WA (US); Akhilesh Mritunjai, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 16/833,351

(22) Filed: Mar. 27, 2020

(51) Int. Cl.
*H04L 47/125* (2022.01)
*H04L 47/70* (2022.01)
*G06F 12/0813* (2016.01)
*H04L 9/06* (2006.01)
*H04L 47/2425* (2022.01)

(52) U.S. Cl.
CPC ........ *H04L 47/125* (2013.01); *G06F 12/0813* (2013.01); *H04L 9/0643* (2013.01); *H04L 47/2425* (2013.01); *H04L 47/827* (2013.01); *H04L 47/828* (2013.01); *G06F 2212/154* (2013.01)

(58) Field of Classification Search
CPC .. H04L 67/1023; H04L 47/10; H04L 67/1038
See application file for complete search history.

(56) References Cited

U.S. PATENT DOCUMENTS

| | | | |
|---|---|---|---|
| 9,553,809 B2 | 1/2017 | Sorenson, III et al. | |
| 2014/0310390 A1* | 10/2014 | Sorenson, III | H04L 67/1023 709/223 |
| 2019/0288947 A1* | 9/2019 | Jain | H04L 67/1002 |

* cited by examiner

*Primary Examiner* — Kodzovi Acolatse
*Assistant Examiner* — Mon Cheri S Davenport
(74) *Attorney, Agent, or Firm* — S. Scott Foster; Kowert, Hood, Munyon, Rankin & Goetzel, P.C.

(57) ABSTRACT

Resilient consistent hashing techniques are implemented to perform requests among nodes of a distributed system. Different load balancers are assigned different groups of request handling nodes that cache data to perform request. Requests are assigned to different load balancers according to a consistent hashing scheme. Load balancers distribute requests among assigned nodes using a load balancing scheme. Different numbers of nodes can be assigned to different load balancers.

20 Claims, 9 Drawing Sheets

RESILIENT CONSISTENT HASHING FOR A DISTRIBUTED CACHE

BACKGROUND

Network-based applications are increasingly implemented in complex, widely distributed environments which may rely upon the performance multiple components to handle the capacity of an operation. A network-based service front-end may, for example, leverage a fleet of nodes to handle incoming requests. Various techniques for dispatching requests across nodes may be implemented in order to ensure that requests are handled in a performant fashion.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Techniques to implement resilient consistent hashing for a distributed cache are described herein. In various embodiments, consistent hashing techniques provide a way to distribute work among multiple nodes in order to handles failures of individual nodes that perform the work, in order to minimize disruption and continue to perform work at the nodes. Consistent hashing, however, can create costly scenarios when adding new resources (e.g., new nodes), as the consistent hashing scheme that directs work may have to be updated and provided to clients in order for those clients to take advantage of the additional resources. Moreover, the consistent hashing scheme may not achieve optimal distribution of workload, in some scenarios, as requests may be overly directed to some resources instead of others according to the hashing technique employed. Resilient consistent hashing techniques, however, may reduce the costs of adding new resources and provide for adaptive handling of uneven distribution from a consistent hashing scheme without breaking the consistent hashing scheme. FIGS. 1A-1D are logical block diagrams illustrating resilient consistent hashing for a distributed cache, according to some embodiments.

Figure 1A:
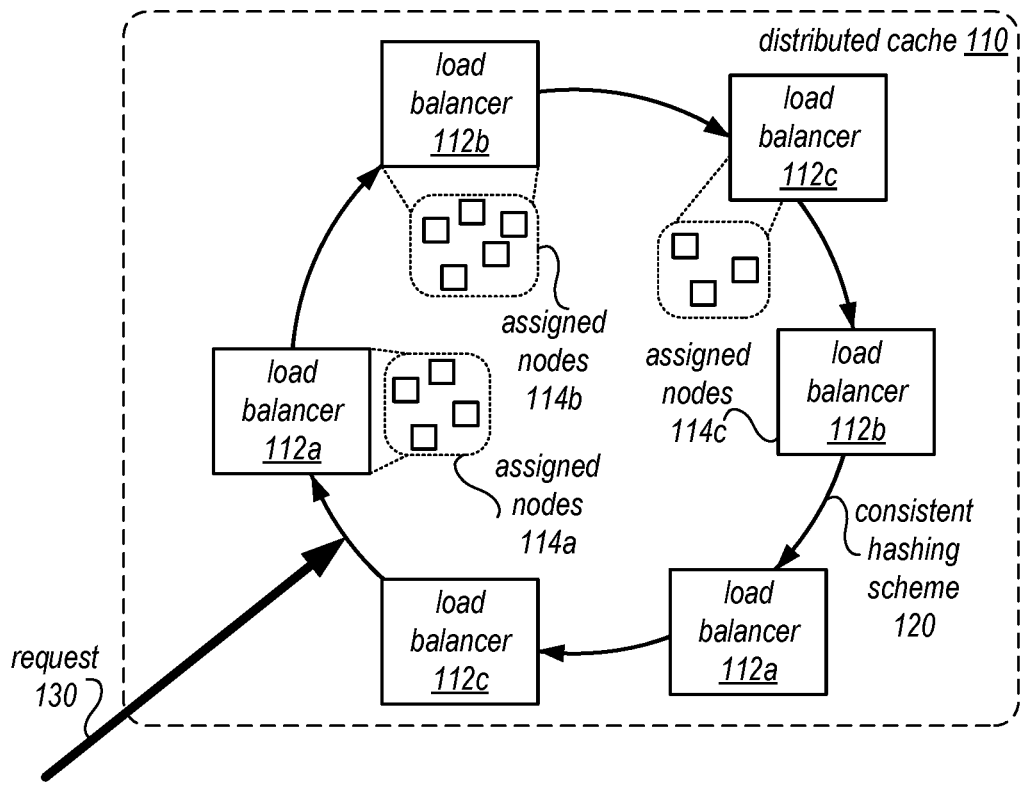
FIGS. 1A-1D are logical block diagrams illustrating resilient consistent hashing for a distributed cache, according to some embodiments.

In FIG. 1A, distributed cache 110 may implement multiple load balancers, such as load balancers 112a, 112b, and 112c. Distributed cache 110 may be a distributed data store or other distributed system that utilizes persistent storage devices (e.g., hard disk drives, flash-based storage devices, solid state drives, non-volatile memory devices, and so on) or non-persistent storage devices (e.g., random access memory (RAM), static random access memory (SRAM), Dynamic RAM (DRAM), Rambus DRAM (RDRAM), Extended Data Out RAM (EDO RAM), Double Data Rate RAM (DDR RAM), synchronous dynamic RAM (SDRAM), EEPROM, and so on). Distributed cache 110 may be implemented as part of a network-based service, system, or other application that utilizes distributes data and work to access, operate upon, or utilize data (e.g., a fleet of request handling nodes that perform identification services for accessing other resources by caching identity information for identifying the source of a request, determining authorized actions for the request, among other operations, before continuing processing that request or passing that request on to other resources of a system (not illustrated)). Distributed cache may implement various nodes (e.g., nodes 230 in FIG. 2) which may perform the various operations based on the requests and cached data. A backup or centralized data store (not illustrated) that serves as the authoritative data store for information cached at nodes may be implemented, in various embodiments, as part of a distributed data store or system implementing distributed cache 110.

In various embodiments, each load balancer 112 may have respectively assigned nodes from the nodes implementing distributed cache 110 for performing requests, such as assigned nodes 114a, 114b, and 114c. Requests, such as request 130 are directed to a load balancer 112 according to a consistent hashing scheme 120. Consistent hashing scheme 120 may, in various embodiments, assign load balancer one or more hash value ranges out of the possible hash values. Such locations may be depicted or illustrated as a ring as all possible hash values may be assigned (via different hash value ranges) to different load balancers (with the ring representing the adjacent hash value ranges from first to last, where the last possible hash value is adjacent to the first possible hash value to connect the hash value ranges into a ring). In this way, any hash value generated for any request will have an assigned load balancer for that request that is identified by determining the hash value for the request and identifying which assigned range that hash value falls within in order to send the request to the load balancer with the assigned range, in some embodiments. For example, request 130 may have an identifier or other value as a parameter of the request which is used to generate a hash value. The generated hash value for the request may then be a hash value that is assigned to load balancer 112*a* (as load balancer 112*a* may have an assigned range that starts after load balancer 112*c*, as depicted in FIG. 1A).

Load balancers 112 may forward the request to one of the assigned nodes 114. For example, in various embodiments, load balancers 112 may utilize load balancing techniques in order to optimize distribution of work among the assigned nodes 114. In this way, assigned nodes 114 can retain information for performing requests from the same sources, caching the information to accelerate performance of the requests. For example, distributed cache 110 may handle requests to describe resources across large scale fleets of computing resources or devices (e.g., hundreds of thousands of devices, millions of devices). In order to ensure that information respective to each of those different devices can be maintained in a cache for optimal performance, assigned nodes can be responsible for caching data that is specific to those requests directed to the assigned load balancer (as opposed to the entire fleet nodes which could result in data eviction which may then have to be obtained from a central data store or other source that involves further network requests and data processing, increasing the latency of requests).

Figure 1B:
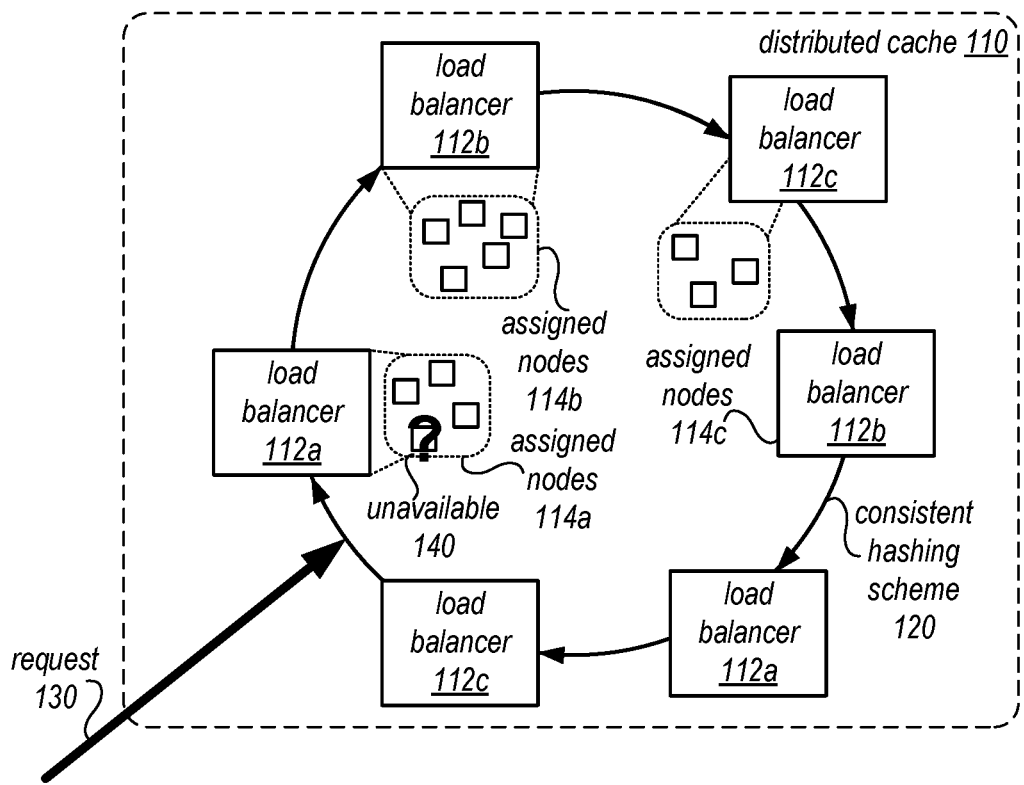
Figure 1C:
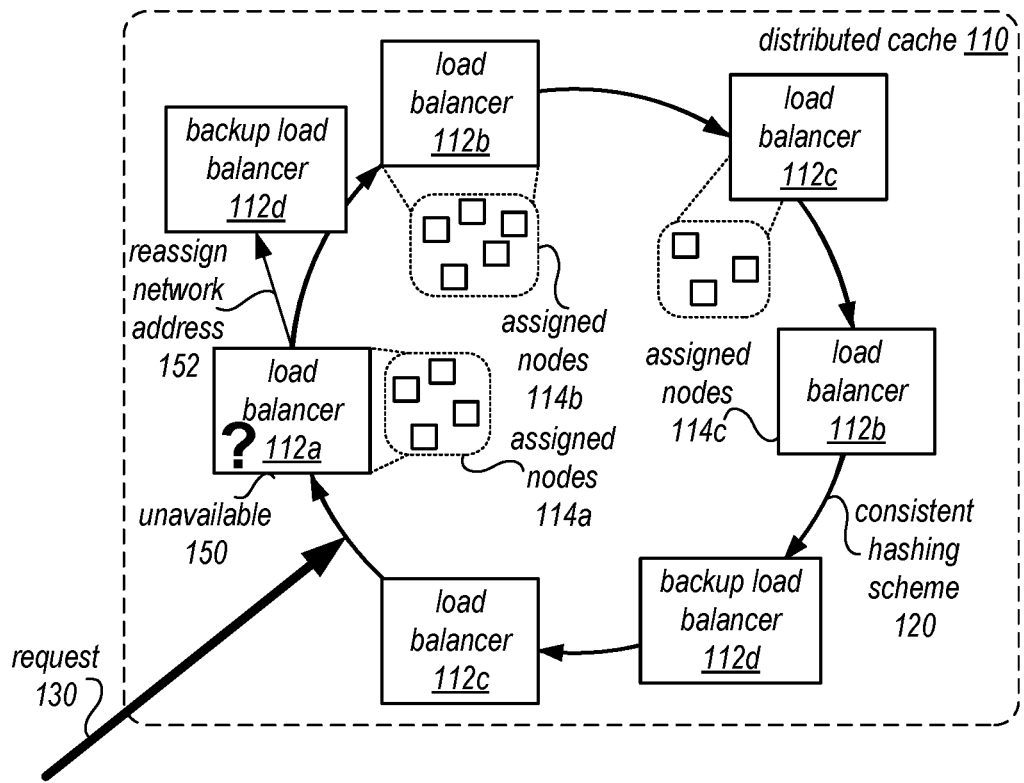

As illustrated in FIG. 1B, a resilient consistent hashing can survive the unavailability of a node, as indicated at 140, because load balancer 112*a* can forward request 130 to another node in assigned nodes 114*a*. For example, a round-robin load balancing technique can be used to select the next available assigned node. In this way, the unavailability of individual node 140 does not disrupt performance of request 130 (as another node candle the request and a client that submitted request 130 would not have to resubmit request 130 to the next node on the ring (as would be the case if nodes were assigned ring positions instead of load balancers)). Moreover, as discussed with regard to FIG. 4, additional nodes can be added to assigned nodes if needed to handle extra workload.

In various embodiments, resilient consistent hashing techniques may improve the performance of distributed cache 110 to handle load balancers unavailability as well. For example, in FIG. 1C, load balancer 112*a* may become unavailable (e.g., due to failure, network partition, etc.), as indicated at 150. One or more backup load balancers, such as load balancer 112*d*, may remain on standby to take over for an unavailable load balancer (e.g., load balancer 112*a*). As indicated at 152, the network address for load balancer 112*a* may be reassigned to backup load balancer 112. In this way, backup load balancer 112*d* may take the place of load balancer 112 in those positions in the consistent hashing scheme 120 to which 112 was previously assigned without imposing a routing change upon client applications. For instance, request 130 may be sent to a network address that was previous assigned to load balancer 112*a* but may cause the request to be sent to backup load balancer 112*d*, without an error or other indication to a client that a different load balancer is handling the request.

In some embodiments, shuffle sharding techniques may be implemented to handle load balancer failures. For instance, load balancer assignments for hash value ranges may be shuffled so that each load balancer has overlapping hash value range assignments in the consistent hashing scheme (as opposed to non-overlapping hash value range assignments). In such an embodiment, any one load balancer's hash value assignments are sufficiently shuffled amongst other load balancers so that the remaining load balancers with overlapping assignments can still handle the requests directed to the unavailable load balancer without any change to the consistent hashing scheme.

Figure 1D:
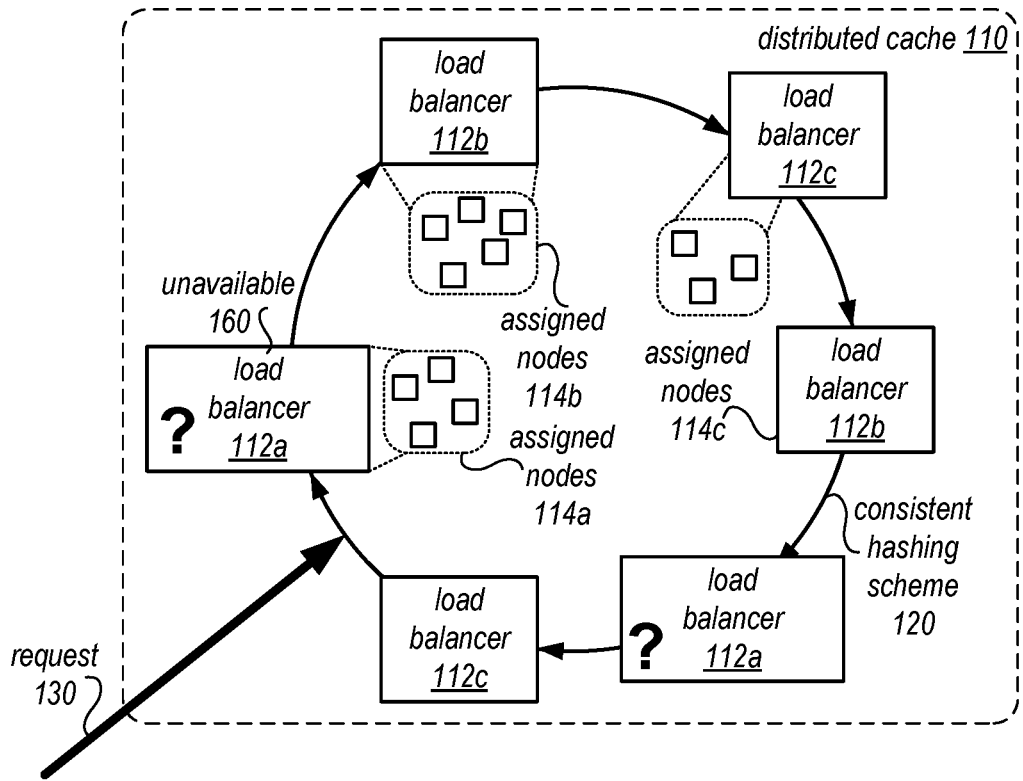

If a backup load balancer is unavailable (or not implemented), in some embodiments, as illustrated in FIG. 1D, an unavailable load balancer indicated at 160, client request 130 can still rely upon consistent hashing techniques to redistribute requests to remaining load balancers 112*b* and 112*c*. For instance request 130 may go to load balancer 112*b* after receiving a failure indication that load balancer 112*a* is unavailable.

Please note that previous descriptions are not intended to be limiting, but are merely provided as examples of the illustrated features. Various other implementations of these features, such as other types of distributed systems that implement or utilize distributed caches including those discussed below, may implement the techniques discussed above.

This specification next includes a general description of a provider network, which may include a service that implements resilient consistent hashing for a distributed cache. Then various examples of the service are discussed, including different components, or arrangements of components that may be employed as part of implementing the service. A number of different methods and techniques to implement resilient consistent hashing for a distributed cache are then discussed, some of which are illustrated in accompanying flowcharts. Finally, a description of an example computing system upon which the various components, systems, devices, and/or nodes may be implemented is provided. Various examples are provided throughout the specification.

Figure 2:
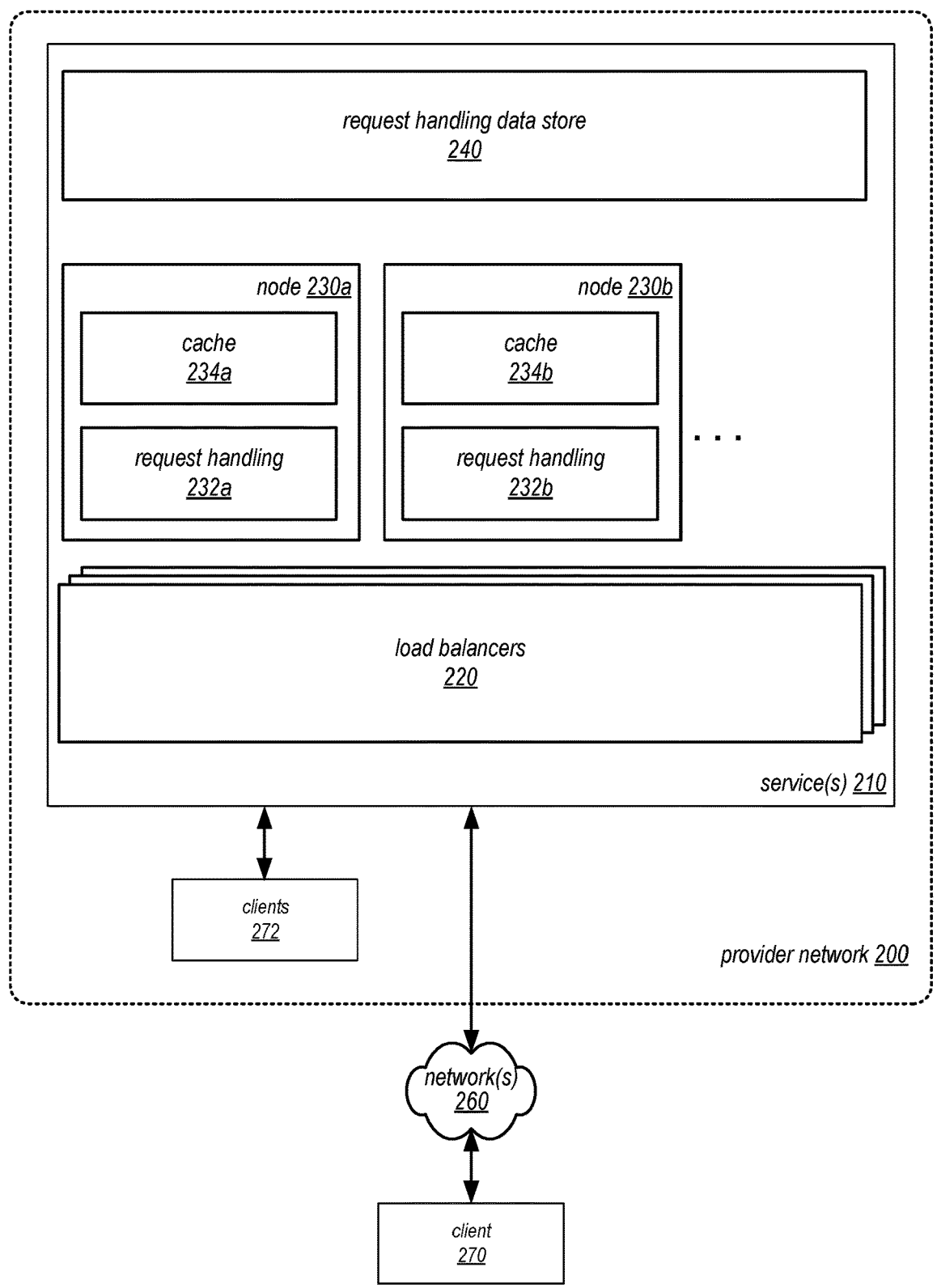
FIG. 2 is a logical block diagram illustrating a provider network that includes a service that implements resilient consistent hashing for a distributed cache, according to some embodiments.

FIG. 2 is a logical block diagram illustrating a provider network that includes a service that implements resilient consistent hashing for a distributed cache, according to some embodiments. Provider network 200 may be a private or closed system or may be set up by an entity such as a company or a public sector organization to provide one or more services (such as various types of cloud-based storage, cloud-based commerce, transaction, or fulfillment platforms) accessible via the Internet and/or other networks to clients. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200.

In some embodiments, provider network 200 may implement service(s) 210, such as database service(s), (e.g., a data warehouse service, relational database services, non-relational database services (e.g., NoSQL) and other database services), data processing services (e.g., a map reduce service, virtual compute services or event-driven compute services), transaction services, and data storage services (e.g., object storage services or block-based storage services that may implement a centralized data store for various types of data), and/or any other type of network based services (which may various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below (e.g., a host server that implements one (or more) nodes of a service). In various embodiments, the functionality of a given system or service component (e.g., a component of service 210) may be implemented by a particular node or may be distributed across several nodes. In some embodiments, a given node may implement the functionality of more than one service system component (e.g., more than one control plane component).

In various embodiments, service(s) 210 may implement multiple nodes (e.g., a fleet of nodes) to handle various requests, such as nodes 230a and 230b. These nodes may perform various requests submitted by clients of service(s) 210, including requests for data or requests to perform operations. Nodes 230 may implement request handling, such as request handling 232a and 232b respectively. Request handling 232 may utilize data to perform a request, such as the context or other information to configure an operation (e.g., parameter values). In some embodiments, the request may be for data itself. Nodes 230a may obtain the data from a back-end service or storage system, such as request handling data store 240.

As services 210, may be implemented as large scale services handling high volumes of requests (e.g., thousands or millions of requests) and/or managing high numbers of resources (e.g., thousands or millions of databases, compute instances, or other computing resources offered by services 210), caching information to perform requests may significantly reduce the latency or time to complete a request (in addition to costs to obtain information from request handling data store 240). To improve performance, nodes 230 may also implement a cache (e.g., in a memory or other high-speed storage device), such as caches 234a and 234b. Caches 234 may store frequently or recently accessed data, in order to avoid having to obtain the data from request handling data store 240.

Request handling 232 may access a cache 234 first in order to determine whether the request can be served using cached data. If not, then the node may obtain the data from request handling data store 240 (and may put the data in cache 234). As large scale systems that handle millions of requests may be distributed across multiple nodes 230, load balancers 220 may be used to implement the distribution of the data to the different nodes. For example, load balancers may apply various load balancing schemes, such as round-robin load balancing. As discussed above with regard to FIG. 1, load balancers 220 may themselves be distributed using a consistent hashing scheme in order to distribute requests across nodes 230 using assigned groups of nodes 230.

Clients 270 of provider network 200 may encompass any type of client configurable to submit requests to provider network 200. For example, a client 270 may include a suitable version of a web browser, or may include a plug-in module or other type of code module configured to execute as an extension to or within an execution environment provided by a web browser, or another client application (e.g., an application hosted in another provider network or private network) that uses or is dependent upon communications sent to some resource provider network 200, such as a web application (or user interface thereof) that utilizes a provider network resource or application, such as a media application, an office application or any other application that may make use of various provider network resources, including to perform various operations. In some embodiments, such an application may include sufficient protocol support (e.g., for DNS protocol or for a suitable version of Hypertext Transfer Protocol (HTTP)) for generating and processing network-based services requests. In some embodiments, clients (e.g., sources 202, management clients 206, and other provider network client(s) 208) may be configured to generate network-based services requests according to a Representational State Transfer (REST)-style network-based services architecture, a document- or message-based network-based services architecture, or another suitable network-based services architecture. In some embodiments, a client 270 may be configured to provide access to a control plane to manage resources. Clients may be associated with particular user accounts, user identifiers, or other information which may indicate the access rights, resources, and other associated information maintained at provider network 200 that implements resources in multi-tenant fashion on behalf of a client. In some embodiments, sources and destinations of a communication (e.g., a client and application) of may be both implemented within provider network 200 (e.g., an object storage service of provider network 200 may utilize a data processing service to format data before storage within the object storage service) to implement various service features or functions and thus various features of clients discussed above may be applicable to such internal clients as well.

Clients may convey network-based services requests to provider network 200 via network(s) 260. In various embodiments, network(s) 260 may encompass any suitable combination of networking hardware and protocols necessary to establish network-based communications between clients 270 and provider network 200. For example, network(s) 260 may generally encompass the various telecommunications networks and service providers that collectively implement the Internet. A network(s) 260 may also include private networks such as local area networks (LANs) or wide area networks (WANs) as well as public or private wireless networks. For example, both a client 270 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client and the Internet as well as between the Internet and provider network 200. It is noted that in some embodiments, clients may communicate with provider network 200 using a private network rather than the public Internet. As illustrated in FIG. 2, in some embodiments, clients of services 210 may be internal to provider network 200, implemented as part of provider network 200, such as clients 272.

Figure 3:
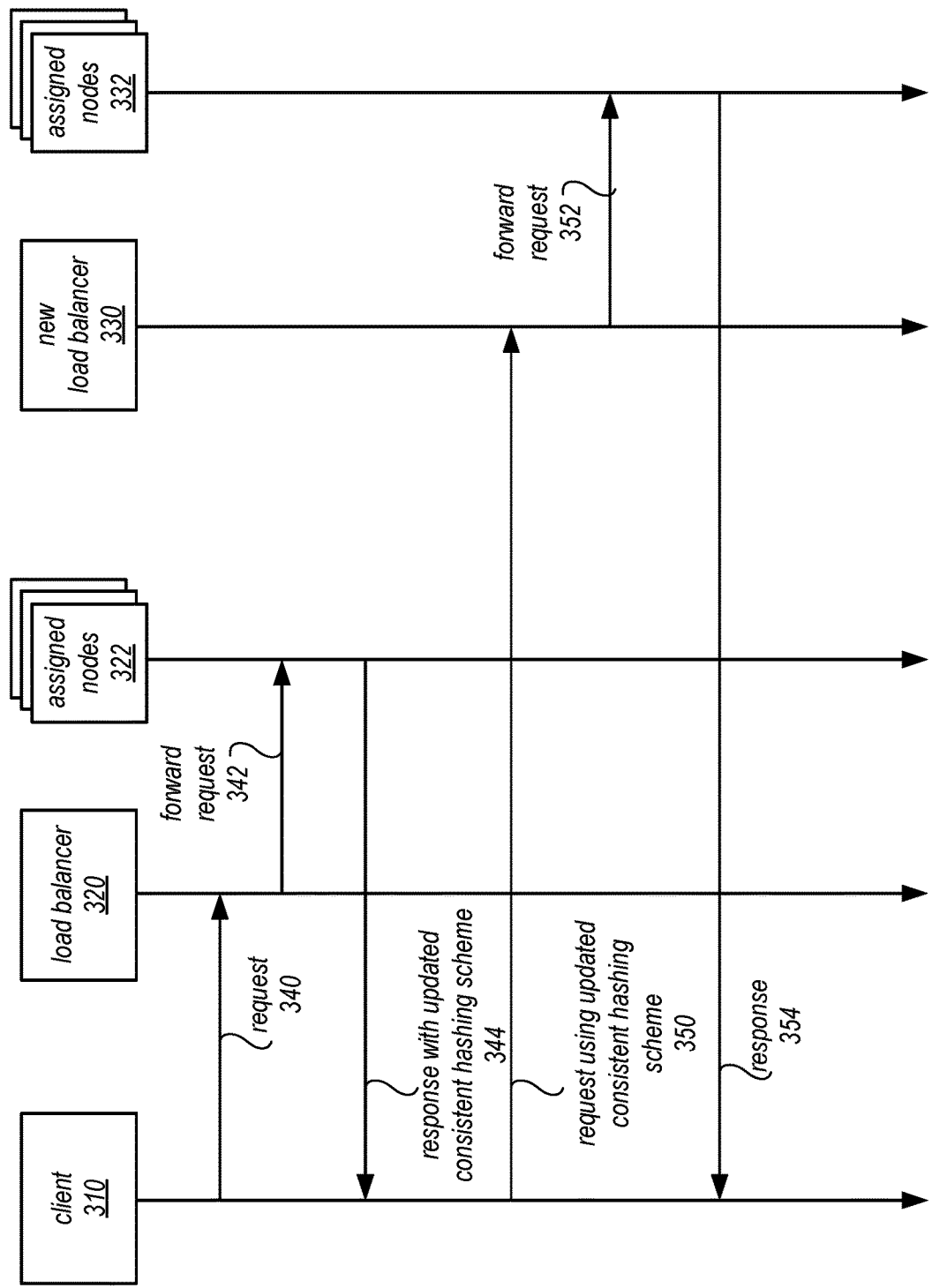
FIG. 3 is a logical block diagram illustrating interactions to provide updates to a consistent hashing scheme to clients, according to some embodiments.

FIG. 3 is a logical block diagram illustrating interactions to provide updates to a consistent hashing scheme to clients, according to some embodiments. Client 310 (e.g., client 270 or 272 in FIG. 2) may send a request 340 to load balancer 320 according to the consistent hashing scheme. Load balancer 320 may forward 342 the request to one of the assigned nodes 322 according to a load balancing scheme (e.g., round-robin, random assignment, hashing, etc.). Assigned nodes 322 may perform the request (e.g., using a cache or obtaining new data).

In some embodiments, updates to the consistent hashing scheme may be caused by adding new load balancers to the consistent hashing schema. These new load balancers, like new load balancer 330, may have assigned nodes 332, and may perform requests (some of which have been previously performed by other load balancers and assigned nodes). To update a client 310 to use the new consistent hash scheme, assigned nodes 322 may include in the response 344 an updated consistent hashing scheme. For example, the different hash value ranges and lists of network addresses for the load balancers may be modified to include the new load balancer. In some embodiments, the new consistent hashing scheme may be identified by a new version number or identifier, which client 310 can use to obtain the new consistent hashing scheme. Assigned nodes may detect the use of an old scheme by a consistent hashing version number or other identifier included in a request, like request 340, in some embodiments.

Client 310 may then use the updated consistent hash scheme to send another request. For example, client 310 may send a request 350 to a different network address identified by the hash value mapping for new load balancer 330 provided as part of the updated consistent hashing scheme. New load balancer 330 can then forward the request 352 to one of the assigned nodes 332 according to a load balancing technique. Note that different load balancers can, in some embodiments, use different load balancing techniques than other load balancers (e.g., load balancer 320 can apply round-robin load balancing, while new load balancer 330 can apply random selection load balancing). An assigned node 332 that is sent the request can then return a response 354.

Figure 4A:
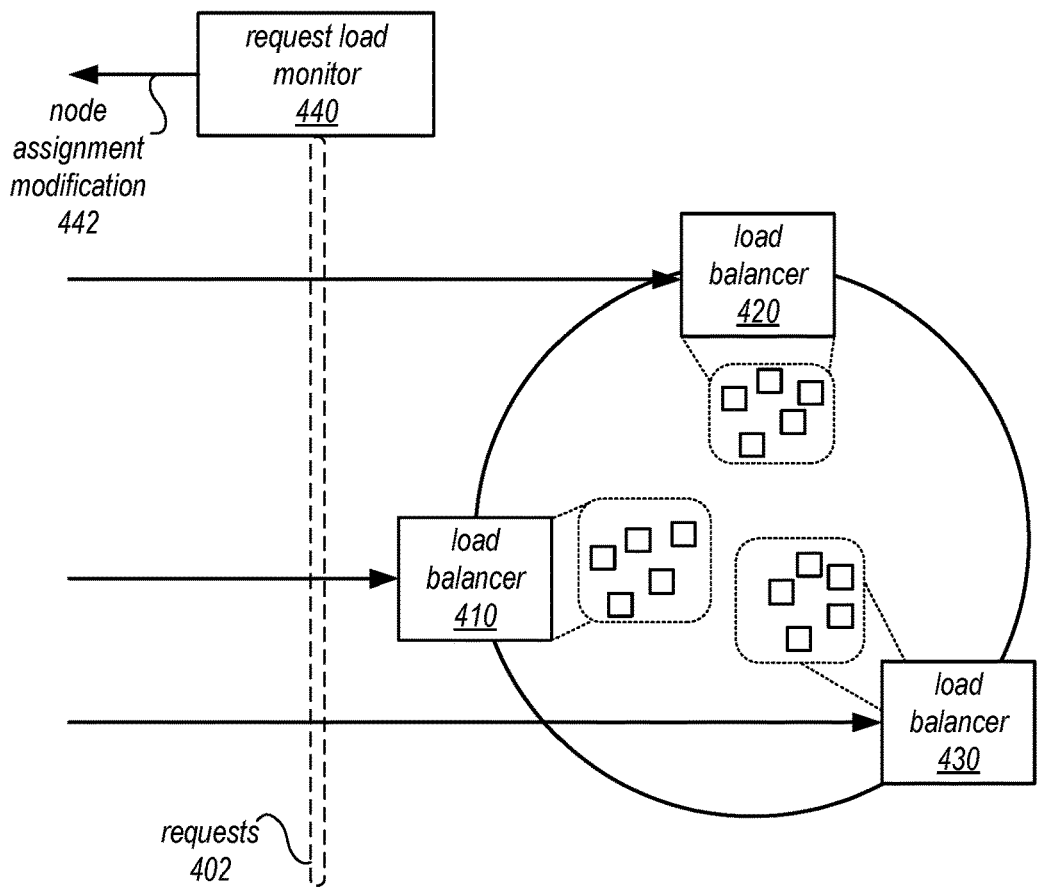
FIGS. 4A-4B are logical block diagrams illustrating request load monitoring, according to some embodiments.
Figure 4B:
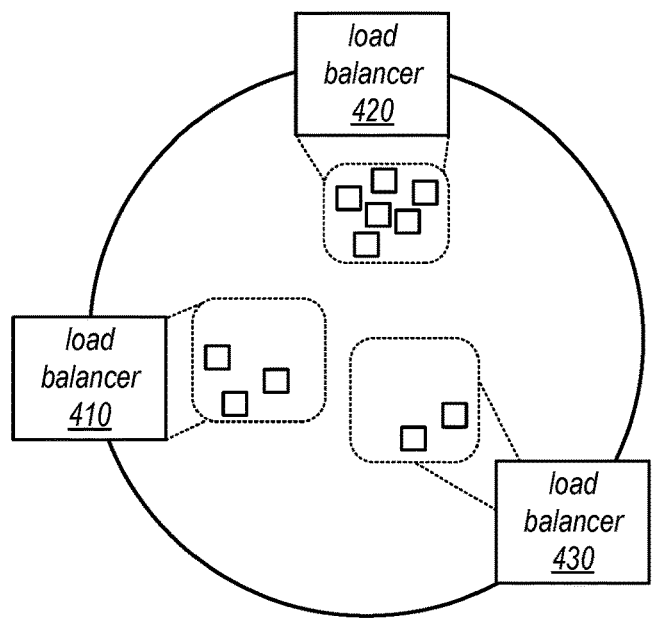

FIGS. 4A-4B are logical block diagrams illustrating request load monitoring, according to some embodiments. In FIG. 4A, a consistent hash scheme for load balancers 410, 420, and 430 may be implemented, as discussed above. Assigned nodes may be provided to the load balancers to perform requests. In at least some embodiments, request load monitoring 440 may be implemented. Request load monitoring 440 may be implemented as part of a control plane or other management feature, in some embodiments. Request load monitoring 440 may evaluate the frequency, latency, processing costs, and/or other performance information for requests 402 directed to the various load balancers in order to determine whether a modification to node assignments should be made.

For example, under-utilization scenarios may be identified, as a load balancer may receive less requests than an optimal utilization supported by the assigned nodes. In another example, over-utilization scenarios may be identified, where the request load may be too much for the assigned nodes to complete and meet performance goals or requirements. Request load monitor 440 may provide a node assignment modification 442. Node assignment modification 442 may be an indication to an operator or other user. In some embodiments, node assignment modification 442 may be provided to an automated node assignment or provisioning service of provider network 200, which in turn may add, remove, or reassign nodes in accordance with the recommendation. For example, in FIG. 4B, load balancer 410 now has 3 assigned nodes, load balancer 420 has 6 assigned nodes, and load balancer 430 has 2 assigned nodes. Such reassignments may be performed without disruption to clients as requests are directed to load balancers and not individual nodes. Moreover, as discussed below with regard to FIG. 5, adding nodes can have cached information warmed in order to reduce the time it takes to make a new node as effective for caching information as existing nodes.

Figure 5A:
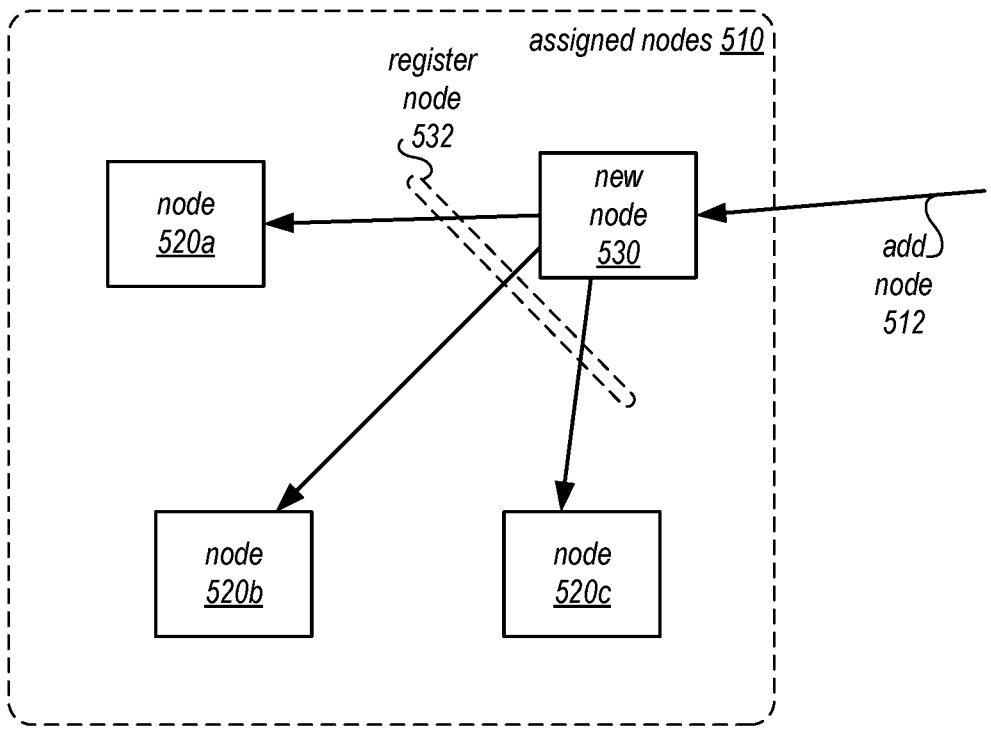
FIGS. 5A-5B are logical block diagrams illustrating cache warming techniques for added nodes, according to some embodiments.
Figure 5B:
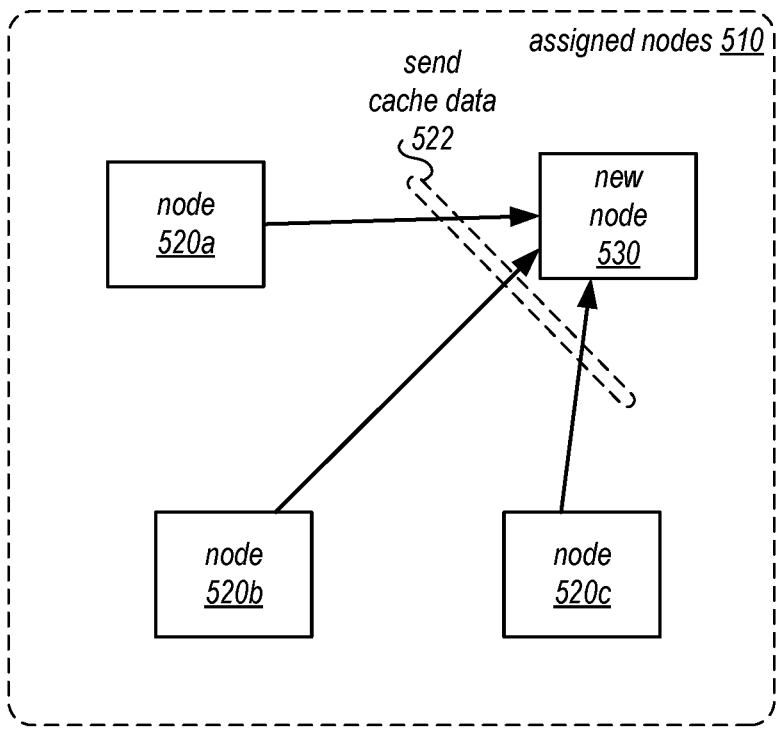

Because nodes can be added or removed to assigned groups for load balancer without disrupting clients (e.g., without having to provide an updated consistent hashing scheme), node changes may occur with greater frequency in order to adjust the number of nodes to meet the workload of requests directed to individual load balancers. Moreover, as node failures may still occur, techniques to increase the speed at which added nodes provide good performance utilizing a cache may be highly desirable. FIGS. 5A-5B are logical block diagrams illustrating cache warming techniques for added nodes, according to some embodiments.

In FIG. 5A, assigned nodes 510 for a load balancer may have a new node 530 added 512. For example, new node 530 may be added to increase capacity of load balancer 510 to handle new requests. In some embodiments, new node 530 may replace a failing node (not illustrated). An automated node deployment system may add new node 530, or manual operations (e.g., performed by an operator) may be performed to add new node 530. New node 530 may send a request to register 532 new node 530 with existing assigned nodes, 520a, 520b, and 520c, in some embodiments.

As illustrated in FIG. 5B, nodes 520 may send cache data 522 to new node 530, in some embodiments in response to the registration of new node 530. New node 530 may store the cached data in a cache at new node 530. In some embodiments, the sent data may be index values, locators, paths, or other information to obtain the cached data, instead of sending the data itself. For example, a common backend store, such as request handling data store 240 may be accessed to obtain the cached data using the provided information from nodes 520a, 520b, and 520c. In some embodiments, a shared cache store (e.g., a shared storage device) may be used to store the cached information (although in other embodiments each node 520 and 530 may utilize its own storage device for cached information).

Figure 6:
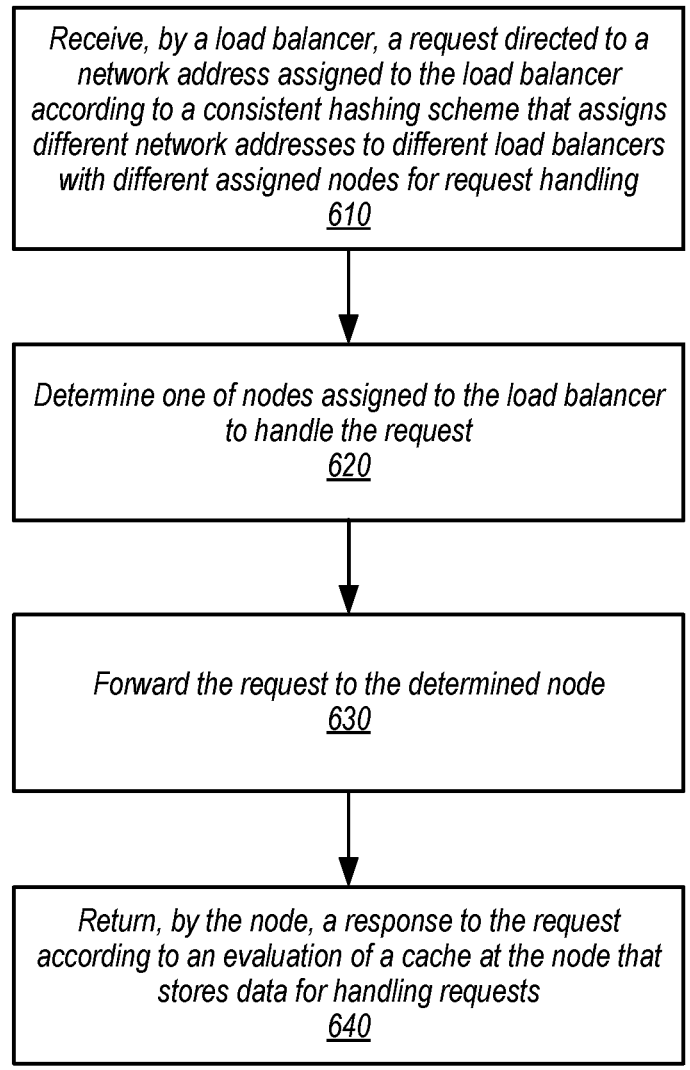
FIG. 6 is high-level flowchart illustrating various methods and techniques that implement resilient consistent hashing for a distributed cache, according to some embodiments.

The examples of resilient consistent hashing as discussed above with regard to FIGS. 2-5B have been given in regard to a service offered by a provider network. Various other types systems or configurations of distributed caches may implement these techniques. FIG. 6 is high-level flowchart illustrating various methods and techniques that implement resilient consistent hashing for a distributed cache, according to some embodiments. Various ones of the systems described above may implement some or all of these techniques, as well as other systems not illustrated above.

As indicated at 610, a load balancer may receive a request directed to a network address assigned to the load balancer according to a consistent hashing scheme that assigns different network address to different load balancers with different assigned nodes for request handling, in some embodiments. As discussed above with regard to FIG. 1, each load balancer in the consistent hashing scheme may have different nodes assigned to receive and handle requests dispatched by the assigned load. The different nodes assigned to different load balancers may be different numbers (e.g., two nodes assigned to load balancer A and 4 nodes assigned to load balancer B).

As indicated at 620, one of the nodes assigned to the load balancer may be determined to handle the request, in some embodiments. For example, different load balancing techniques may be performed to determine the node, such as round-robin, random distribution, among others. The load balancer may be able to understand which assigned nodes are available or unavailable (e.g., due to failure, network failure, overload, etc.) when making a load balancing determination. In this way, a request may be forwarded to a different assigned node As indicated at 630, the load balancer may forward the request to the determined node, in some embodiments. The node may perform request processing to determine how to handle the request. In various embodiments, the request may evaluate the cache for a hit to determine if data needed or used to perform the request (or requested by the request) is present in the cache, as indicated at 640. If not, then the request handling node may read, call, request, or otherwise obtain the data for the request from another system (e.g., a storage system). The obtained data may then be used to performed request. In some embodiments, the obtained data may be shared with other assigned nodes for the load balancer to prevent future requests causing a cache miss at those other assigned nodes. The node may return a response according to the evaluation, using data found in the cache or data obtained elsewhere that is not present in the cache.

Figure 7:
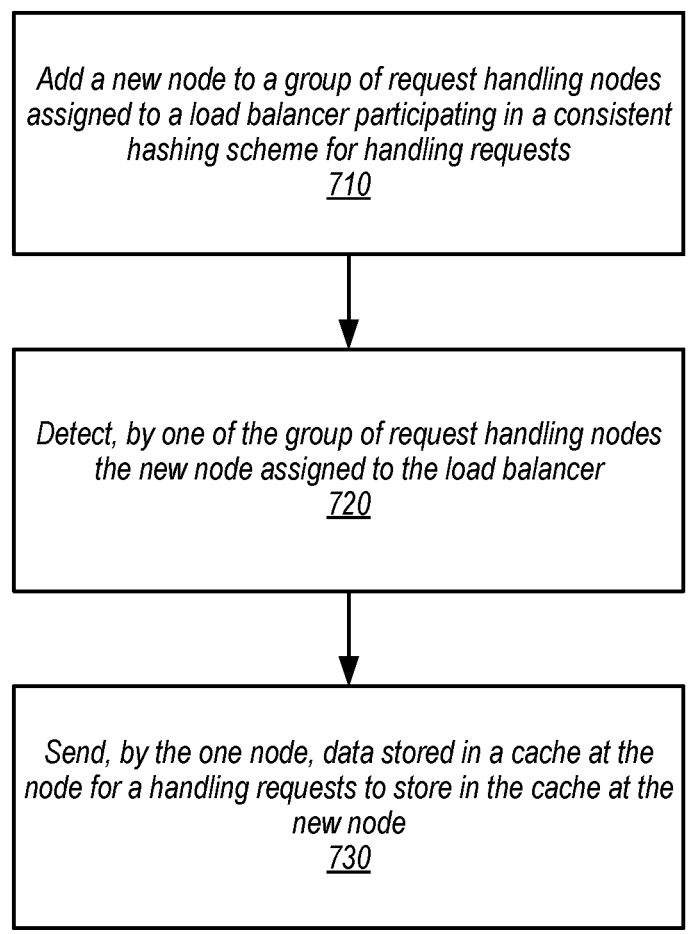
FIG. 7 is a high-level flowchart illustrating various methods and techniques for warming a cache at a newly assigned node to a load balancer in a consistent hashing scheme for request handling, according to some embodiments.

As new nodes may be added to increase or replace request processing capacity behind an assigned load balancer, techniques to improve the performance of the added node may also be implemented. Cache warming techniques may be performed to make the new node able to avoid having to obtain data from outside of the node instead of using the cache. FIG. 7 is a high-level flowchart illustrating various methods and techniques for warming a cache at a newly assigned node to a load balancer in a consistent hashing scheme for request handling, according to some embodiments.

As indicated at 710, a new node may be added to a group of request handling nodes assigned to a load balancer participating in a consistent hashing scheme for handling requests, in some embodiments. For instance, the new node may be added to a data center as part of adding a new server rack or hosts for handling additional requests. In some embodiments, the new node may be reassigned from another load balancer (as discussed above with regard to FIGS. 4A-4B.

As indicated at 720, the new node by detected by one (or more) of the request handling nodes the new node assigned to the load balancer, in some embodiments. For example, the new node can send a request identifying itself to the current nodes. In other embodiments, a control plane or other management component can identify the new node. As indicated at 730, data stored in the cache the node for handling requests to store in the cache at the new node by the one node. For example, the cache entries could be copied to the new node, an indication of what values to copy may be identified (so that the new node can proactively obtain the data).

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 8:
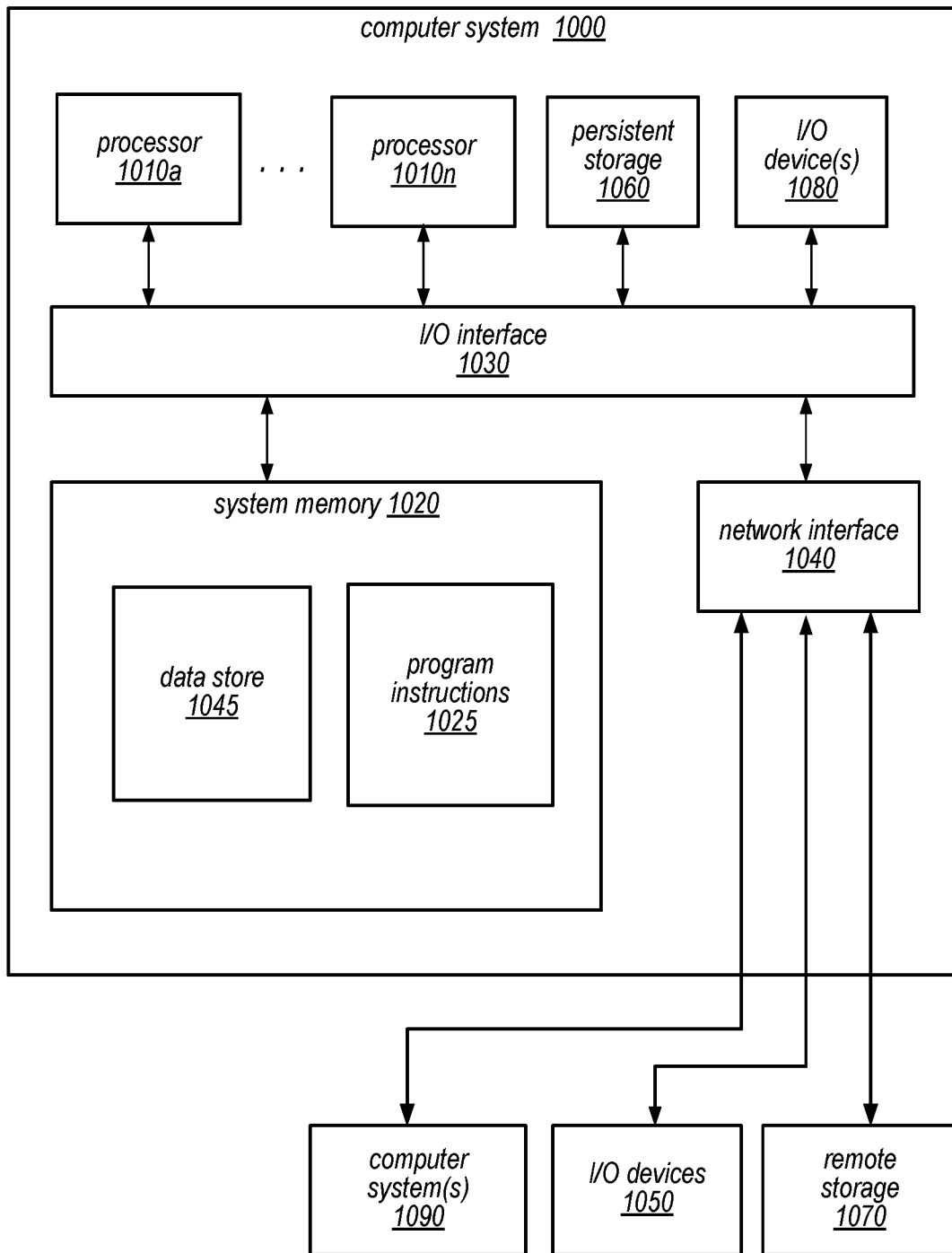
FIG. 8 is a block diagram illustrating an example computing system, according to some embodiments.

Embodiments of resilient consistent hashing to network communications at a proxy may be executed on one or more computer systems, which may interact with various other devices. FIG. 8 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the data warehouse system described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a multi-tenant provider network, in different embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090 (which may implement one or more storage system server nodes, database engine head nodes, and/or clients of the database systems described herein), for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 8 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A provider network, comprising:
a plurality of service nodes for a service implemented as part of the provider network, wherein the plurality of service nodes respectively comprise at least one processor and a memory, and wherein the plurality of service nodes handle service requests;
a plurality of load balancers, wherein different respective groups of the plurality of service nodes are assigned to different ones of the load balancers;
a load balancer of the plurality of load balancers, configured to:
receive a request directed to a network address, wherein a consistent hashing scheme identifies the load balancer out of a plurality of load balancers for load balancing the request according to a hash value determined for the request, wherein the consistent hashing scheme assigns different network addresses including the network address to different ones of the plurality of load balancers including the load balancer;
identify a service node of the respective group of service nodes assigned to the load balancer to handle the request according to a load balancing scheme for distributing requests amongst the respective group of service nodes;
send, the request to the identified service node assigned to the load balancer; and
the service node configured to:
evaluate a cache at the service for data to handle the request; and
return a response to the request according to the evaluation of the cache.

2. The system of claim 1, wherein the service node is further configured to:
detect a new service node assigned to the load balancer; and
send the data stored in the cache to the new service node.

3. The system of claim 1, wherein the response to the request indicates an update to the consistent hashing scheme to include a new load balancer and new plurality of service nodes assigned to the new load balancer.

4. The system of claim 1, wherein the service node is further configured to:
evaluate the data stored in the cache to determine that the data is not applicable to responding to the request;
obtain applicable data to respond to the request;
store the applicable data in the cache; and
send the applicable data to other service nodes of the group of service nodes to store the applicable data in respective caches at the other service nodes.

5. A method, comprising:
receiving, by a load balancer, a request directed to a network address, wherein a consistent hashing scheme identifies the load balancer out of a plurality of load balancers for load balancing the request according to a hash value determined for the request, wherein the consistent hashing scheme assigns different network addresses including the network address to different ones of a plurality of load balancers including the load balancer;
determining, by the load balancer, one of a plurality of nodes assigned to the load balancer to handle the request, wherein different respective pluralities of nodes, including the plurality of nodes, are assigned to different ones of the plurality of load balancers;
forwarding, by the load balancer, the request to the determined node assigned to the load balancer; and
returning, by the one node, a response to the request according to an evaluation of a cache at the node that stores data for handling requests.

6. The method of claim 5, further comprising:
detecting, by the one node, a new node assigned to the load balancer; and
sending, by the one node, the data stored in the cache to the node.

7. The method of claim 5, wherein a number of the plurality of nodes assigned to the load balancer is different than a number of the respective plurality of nodes assigned to another one of the load balancers.

8. The method of claim 5, wherein the response to the request indicates an update to the consistent hashing scheme to include a new load balancer and new plurality of nodes assigned to the new load balancer.

9. The method of claim 5, further comprising:
receiving, by the load balancer, a second request directed to the network address that is assigned to the load balancer according to the consistent hashing scheme;
determining, by the load balancer, a different one of the plurality of nodes assigned to the load balancer to handle the request based, at least in part, on a determination that the one node is unavailable.

10. The method of claim 5, further comprising:
monitoring request load to the plurality of load balancers; and
providing a recommendation to modify a number of nodes assigned to at least one of the load balancers based, at least in part, on an evaluation of the request load.

11. The method of claim 5, further comprising:
prior to receiving the request:
detecting unavailability of another load balancer a network address that is assigned to the other load balancer according to the consistent hashing scheme; and
reassigning the network address to the load balancer instead of the other load balancer.

12. The method of claim 5, wherein the response to the request is returned using at least a portion of the data stored in the cache, and wherein the portion of the data was received from another one of the plurality of nodes assigned to the load balancer.

13. The method of claim 5, wherein the plurality of load balancers and the different respective pluralities of nodes are implemented as part of a service offered by a provider network.

14. A system, comprising:
a plurality of cache nodes that implement a distributed cache, the cache nodes respectively comprising at least one processor and a memory;
a plurality of load balancers, wherein different respective groups of the plurality of cache nodes are assigned to different ones of the load balancers;
a load balancer of the plurality of load balancers, configured to:
  receive a request directed to a network address, wherein a consistent hashing scheme identifies the load balancer out of a plurality of load balancers for load balancing the request according to a hash value determined for the request, wherein the consistent hashing scheme assigns different network addresses including the network address to different ones of the plurality of load balancers including the load balancer;
  determine one of the respective group of cache nodes assigned to the load balancer to handle the request;
  forward the request to the determined cache node assigned to the load balancer; and
the cache node configured to return a response to the request according to an evaluation of a cache at the node that stores data for handling requests.

15. The system of claim 14, wherein the cache node is further configured to:
detect a new cache node assigned to the load balancer; and
send the data stored in the cache to the new node.

16. The system of claim 14, wherein the response to the request indicates an update to the consistent hashing scheme to include a new load balancer and new plurality of cache nodes assigned to the new load balancer.

17. The system of claim 14, wherein a number of the respective group of nodes assigned to the load balancer is different than a number of the respective group of nodes assigned to another one of the load balancers.

18. The system of claim 14, wherein the load balancer is further configured to:
receive a second request directed to the network address that is assigned to the load balancer according to the consistent hashing scheme;
determine a different one of the plurality of nodes assigned to the load balancer to handle the request based, at least in part, on a determination that the one node is unavailable.

19. The system of claim 14, wherein the response to the request is returned using at least a portion of the data stored in the cache, and wherein the portion of the data was received from another one of the group of cache nodes assigned to the load balancer.

20. The system of claim 14, wherein the one cache node is further configured to:
evaluate the data stored in the cache to determine that the data is not applicable to responding to the request;
obtain applicable data to respond to the request;
store the applicable data in the cache; and
send the applicable data to other cache nodes of the group of cache nodes to store the applicable data in respective caches at the other cache nodes.

* * * * *